United States Patent [19]

Reddy et al.

[11] Patent Number: 6,013,303
[45] Date of Patent: *Jan. 11, 2000

[54] LOW FAT SQUEEZABLE SPREAD

[75] Inventors: Podutoori Ravinder Reddy, Columbia, Md.; Carolina Maria Hilhorst, Reigate, United Kingdom; Rowdy Van Gelder, Krimpen Aan Den Ijssel, Netherlands

[73] Assignee: Lipton, Englewood Cliffs, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/974,911

[22] Filed: Nov. 20, 1997

Related U.S. Application Data

[60] Provisional application No. 60/034,660, Jan. 9, 1997, abandoned.

[51] Int. Cl.[7] ..................................................... A23D 7/015
[52] U.S. Cl. ............................................. 426/603; 426/602
[58] Field of Search ........................................ 426/603, 602

[56] References Cited

U.S. PATENT DOCUMENTS

| | | | |
|---|---|---|---|
| 3,539,365 | 11/1970 | Durand | 106/197 |
| 5,011,701 | 4/1991 | Baer et al. | |
| 5,151,290 | 9/1992 | Norton | 426/602 |
| 5,209,942 | 5/1993 | Bauer et al. | |
| 5,286,510 | 2/1994 | Bauer et al. | |
| 5,294,455 | 3/1994 | O'Brien | 426/603 |
| 5,306,517 | 4/1994 | Norton | 426/602 |
| 5,306,519 | 4/1994 | Peterson | 426/575 |
| 5,338,560 | 8/1994 | Wesdorp | 426/602 |
| 5,441,753 | 8/1995 | McGenley | 426/573 |
| 5,501,869 | 3/1996 | Bulega | 426/578 |
| 5,512,311 | 4/1996 | Capitani | 426/661 |
| 5,554,407 | 9/1996 | Bodor | 426/603 |
| 5,614,243 | 3/1997 | Dunn | 426/605 |
| 5,837,307 | 11/1998 | Bodor | 426/603 |

OTHER PUBLICATIONS

Anon, (1996), Avicel ®RC and CL, Database [Online] Product information pp. 1–5 web site=www. avicel. com/products/rccl. html accessed on Aug. 30, 1999.

Anon 1999 Ultra–Tex ®3 Database [Online] p. 1 web site=www. foodstarch. com/24ae. htm, accessed on Aug. 30, 1999.

Anon 1999 Colflo ®67 Database [Online] p. 1 web site: www: foodstarch. com/colflo–67. htm, accessed on Aug. 30, 1999.

Anon 1999 Thermflo ®Database [Online] p. 1 web site: www. foodstarch. com/thermflow. htm accessed on Aug. 30, 1999.

Anon 1999 frigex ®W, Database [Online] web site: www. foodstarch. com/frigex–w. htm accessed on Aug. 30, 1999.

Clegg 1996 J. Food Science 61 (5) 1073–1079.

*Primary Examiner*—Carolyn Paden
*Attorney, Agent, or Firm*—Matthew Boxer

[57] ABSTRACT

A squeezable spread composition and a method of making it is described herein. The composition contains a unique ratio of a colloidal microcrystalline cellulose, a cross-linked and stabilized starch, and a maltodextrin combined with an acidifying agent, less than 5% fat, hydrocolloids, water and optionally an opacifier. The low fat product is pourable at 45–70° F.

10 Claims, No Drawings

LOW FAT SQUEEZABLE SPREAD

This application claims the benefit of U.S. Provisional Applicaton No. 60/034,660, filed Jan. 9, 1997, now abandoned.

FIELD OF THE INVENTION

The invention relates to a unique combination of ingredients and a process for the preparation of a very low fat squeezable spread which mimics the functional properties of higher fat containing spreads.

BACKGROUND OF THE INVENTION

Recent trends in the field of spread products have been directed to the development of reduced fat or substantially fat free products which also possess a smooth and creamy mouthfeel, as well as a texture and lubricity which approach the texture and mouthfeel of edible fat containing food products. While low and no fat spreads are desirable, it has been observed that spreads having less than about 40% fat suffer from severe emulsion instability after prolonged storage at refrigerator temperature. Pools of oil and moisture are observed in such products and it is believed that the fat of the products recrystallize upon storage causing the emulsion instability problem.

To address this problem, in part, substantial work has been carried out with bulking agents such as powdered and microcrystalline cellulose in fat-containing and reduced fat food products. U.S. Pat. No. 5,011,701 and patents cited therein relate to the preparation, or use of various types of cellulose in food products. However, reducing the fat content of spreads by including substantial levels of cellulose products, such as microcrystalline cellulose, adversely affect the organoleptic properties of the products and create undesirable mouthcoating or drying sensation.

Microcrystalline cellulose has been used in low and reduced calorie food formulations as both a carbohydrate thickening agent and as a fat replacer. Generally with the adverse results discussed above.

U.S. Pat. No. 5,286,510 and U.S. Pat. No. 5,209,942 deal with the adverse effect in salad dressing products by combining a colloidal microcrystalline cellulose with a cold water swelling starch in combination with various gums and alginate derivative.

Although this combination works well in a salad dressing, the large quantities of microcrystalline cellulose and starch severely affect the organoleptic properties of a spread product.

Heretofore, the preparation of a low fat spread containing a microcrystalline cellulose yet having excellent fat functional mimetic properties while using relatively low energy processes has not been completely satisfactory.

Accordingly, it is an object of the invention to overcome one or more of the disadvantages of the art with the benefit of producing a low fat spread with the taste and functionality of a full fat product which is also squeezable and effective to produce.

SUMMARY OF THE INVENTION

It has now been discovered that a squeezable spread having less than 5% fat may be prepared with low thermal and mechanical energy to produce a fully fat functional mimetic properties. By employing a unique ratio of a fat mimetic combination of cross linked and stabilized starch, maltodextrins, and colloidal microcrystalline cellulose and Sodium carboxy methyl cellulose with a mixture of gums, an emulsifier system and an acidifier to obtain the desired pH. A consumer acceptable squeezable yet low fat product is produced. Optionally, opacifiers, preferably titanium dioxide, are also present in the product. Unique methods of adding the ingredients to process the invention have also been discovered.

Accordingly the squeezable spread compositions of the invention comprise a unique combination of 1 to 5 wt. % of a colloid microcrystalline cellulose and carboxy methyl cellulose or salts thereof; 0.5 to 3% of a crosslinked and stabilized starch; 1 to 5 wt. % of a maltodextrin; 0.1 to 2% of a hydrocolloid selected from the group consisting of xanthan gum, guar gum, carrageenan gum, locust bean gum or mixtures thereof; 0.01 to 1% of an acidifier selected from the group consisting of lactic acid, citric acid and mixtures thereof; less than 5 wt. % of a fat; 0.05 to 1% of a non-protein based emulsifier, or 0.1 to 3% of a protein based emulsifier; up to 5% of an opacifier selected from the group consisting of titanium dioxide, milk solids and the like provided an opacifier is desirable; and 70 to 99% water to form a stable essentially dispersed oil phase.

The spread is produced by first forming the aqueous phase by mixing water, the acidifier and the combination of microcrystalline cellulose and carboxy methyl cellulose or salts thereof, as described above, in a mixing tank. The remaining ingredients of the aqueous phase including the starch and gums are then added. The mixture is heated up to about 185° F. to form a homogeneous mixture and achieve pasteurization. The heated mixture is then cooled to about 70° F. and the oil components are added to the cooled mixture to form the product.

DETAILED DESCRIPTION OF THE INVENTION

Starting materials used in preparing the compositions of the invention are either known or can be prepared according to known methods.

The squeezable spread of the invention has a smooth texture, rich mouthfeel, long term storage stability and a pourable texture at about 40–70° F.

The fat, to the extent used in the composition, is present in amounts only up to about 5%, preferably 1 to 4%, more preferably 2 to 3.5% by weight of the spread. The terms "fat" and "oil" are interchangeable for purposes of this application.

Sources of fat include either animal or vegetable fats. Moreover, the fats may be partially hydrogenated, or interesterified, or unhydrogenated. Typical fats include any of the known edible triglycerides. Butterfat is a preferred dairy fat source.

Vegetable oils are preferably used including the conventional oils such as soybean oil, corn oil, cottonseed oil, peanut oil, safflower oil, sunflower oil and rapeseed. The preferred oils are unhydrogenated liquid oils. Especially preferred is soybean oil.

Emulsifiers which aid in forming an oil-in-water emulsion may be used in the compositions of the invention. Non-protein based emulsifiers include polysorbate 60, polysorbate 80, phosphitides and lecithin. Preferably the non-protein based emulsifiers are present in compositions of the invention in about 0.05 to about 1%. Protein based emulsifiers may also be included in compositions of the invention and can be present in about 0.1 to about 3 weight %. Emusifiers used in the compositions of the invention may be present in the fat phase or the aqueous phase.

The microcrystalline cellulose of the invention may be any microcrystalline cellulose prepared as known in the art. For example, Avicel® microcrystalline cellulose is supplied by the FMC Corporation. Preparation of this type of microcrystalline cellulose is described in Bulletin G-34 on Avicel® produced by FMC.

Avicel® CL-611 is a particularly preferred microcrystalline cellulose because of its colloidal properties. This material is a colloidal grade prepared by co-processing with microcrystalline cellulose and sodium carboxy methyl cellulose. Other salts of carboxy methyl cellulose may be employed in the compositions of this invention. The salts of carboxy methyl cellulose include the potassium salt, the calcium salt, and most preferably the sodium salt. When used herein, microcrystalline cellulose preferably means such a co-processed cellulose that 70% of the material has a particle size of less than 0.2 microns. In compositions of the invention Avicel® CL-611 is present in about 1 to about 5 wt. %.

Selected hydrocolloids used in the compositions include xanthan gum, guar gum, carrageenan gum, locust bean gum or mixtures thereof. Preferably guar and xanthan gum are mixed together in a guarto xanthan gum ratio of 1:1 to 1:3.

By "xanthan gum" is meant the heteropolysaccharide produced by fermentation of the microorganism of the genus Xanthomonas. A discussion of the physical and chemical properties may be found in Industrial Gums, R. L. Whistler, Ed., Academic Press, N.Y., (1973).

If carrageenans are used, they are structural polysaccharides of red sea plants such as *Chondus crispus* and *Gogartoma stellata*. There are several varieties of carrageenans which may be extracted from red sea plants for food use, including kappa, lambda and iota carrageenans. Carrageenans are strongly charged anionic polyelectrolytes of high molecular weight and regular configuration which have anionic sulfate ester groups regularly disposed along a polysaccharide backbone. Lambda carrageenan has a general linear structure having substantially three pendant sulfate groups for each two monosaccharide groups along the polymer backbone.

Kappa carrageenan and iota carrageenan have significantly less ester sulfate than lambda carrageenan, with iota carrageenan having approximately one sulfate group per monosaccharide group, and kappa carrageenan having approximately one sulfate group for each two monosaccharide groups along the backbone. A discussion of the physical and chemical properties of lambda carrageenan may be found in Industrial Gums mentioned above.

Addition of gum at some stage in the process to the microcrystalline cellulose dispersion has several purposes. Coating the particulate cellulose with gum has the qualities of improving mouthfeel, improving texture, mitigating undesirable flavors and sensations, and improving stability.

It is important to add the gum without clumping or aggregation so as to form a well mixed dispersion.

The modified food starch present in the invention is both cross-linked and stabilized as described in Wurzburg, O. B., "Modified Starches: Properties and Uses", Chapter 12, pp. 199–202, herein incorporated by reference.

Waxy starches such as corn and rice are modified by the introduction of difunctional agents which react with hydroxyl groups of the starch to crosslink two different molecules of the starch. Stabilization is achieved by the introduction of substituent groups on the starch hydroxyl groups which distort linearity and disrupt intermolecular associates of the outer branch chains of the amylopectin. Stabilized starches do not exhibit the tendency to gel. Commercial examples of suitable starches include Frigex W.®, Col. Flo 67® and Thermflow® both supplied by National Starch and Chemical Corp.

The cross-linked and stabilized starch may be present in a ratio of starch to microcrystalline cellulose of about 0.5:1 to 2:1.

Maltodextrins are present in the invention in an amount of 0.5% to 3% by weight, preferably 1 to 3% by weight. Maltodextrins are starch hydrolysates having a lower dextrose equivalent, such as a DE of 15 to 40, preferably 15 to 25.

The squeezable spread of the invention comprises from about 55 to about 95% by weight moisture, preferably from about 70 to about 95%.

Proteins may be added to the composition, but preferably are not present in more than 3 wt. %. The amount of the dairy protein ingredient is critical to provide a good tasting and excellent mouthfeel product, and depending on the type of protein it can also be used as an emulsifier in oil-in-water emulsion. The dairy protein can be derived from any dairy source, such as whole milk, skim milk, cultured butter milk, butter milk powder, skim milk powder, cheese powder, yogurt, guark, frommage, whey powder, butter, etc. A preferred dairy source is whey powder.

Non-dairy ingredients may also be present in the composition such as vegetable protein, preferably soybean extracted proteins.

A number of optional ingredients may also be present such as desirable flavor and colorants as known in the art.

Flavors which are suitable include both artificial and natural flavors such as sodium chloride, butter flavor, margarine flavor, fruit flavors, spices, nut flavors, vegetable flavors, herbs, dairy flavors, distilled beverage flavors, cheese flavors, seafood flavors, meat flavors, candy flavors, etc. as known in the art.

Preferably the level of flavoring materials is less than 1.0 wt. %, more preferably 0.001 to 0.5 wt. %.

Preferably the level of sodium chloride is from 0 to 4 wt. %, more preferably 0.1 to 3 wt. %, most preferably 0.5 to about 2.5 wt. %.

Colors which are suitable include beta-carotene, annatto, turmeric, caramel color, paprika and FD&C dyes. Typically the colors will be dissolved or dispersed in the fat phase or the water phase to expedite blending. Colors are present in the composition in an amount of less than 1 wt. %, preferably 0.001 to 0.1 wt. %.

To control microbiological and oxidative deterioration, preservatives are incorporated in the composition to control mold and yeast growth, the products may contain benzoic acid, sorbic acid, and the soluble salts of these and other materials.

Preferred anti-microbials are potassium sorbate, sodium sorbate, potassium benzoate, sodium benzoate and phosphoric acid preferably incorporated at a level of up to 4 wt. %, more preferably 0.01 to 2 wt. %. Especially preferred is potassium sorbate.

Acidifiers may be incorporated to maintain the pH of the aqueous phase of the product at a desirably level, preferably from 3 to 7, more preferably from 3.5 to 6, most preferably 4 to 6. Suitable acidifiers are lactic acid, phosphoric acid, citric acid and any acid conventionally used in the art incorporated at a level of about 0.01 to 1 wt. % preferably 0.01 to 0.1 wt. %.

If desired, a chelating agent such a EDTA, is employed to tie up metal ions which may otherwise interact with one or more of the ingredients in an undesirable manner.

The compositions of the invention are prepared by first forming an aqueous phase. The ingredients except for the oil, emulsifiers and flavors are cooked to form a paste in a steam jacketed water cooled kettle which is fitted with a swept surface agitator or in a heat exchanger. Kettle cooking obviously requires more time for warm up and cooling than cooking in sweep surface exchangers. The time varies from about 17 minutes to 30 minutes for the kettle with two to 30 minutes hold time depending on the final desired temperature, generally 145° F. to 185° F. to a much shorter hold time (about 2–30 seconds) up to about 185° F. in scraped surface heat exchanger unit. The aqueous phase is cooled in the cooling section to about 70° F. or less.

Lastly the oil, emulsifiers and flavors are added to the cooled mixture.

All parts and proportions herein are on a weight percent basis unless otherwise specified.

Having generally described various aspects of the present invention, the invention will now be more particularly described with reference to the following non-limiting examples.

EXAMPLE 1

Squeezable spreads of the invention were prepared as follows:

| Component | Wt. Percent |
|---|---|
| Part 1: | |
| Water | 78–85 |
| Microcrystalline cellulose and sodium carboxy methyl cellulose[1] | 2.5–3.5 |
| Maltodextrin | 1.5–3.0 |
| Modified waxy cornstarch[2] | 1–2 |
| Guar gum | 0.1 |
| Xanthan gum[3] | 0.3 |
| Part 2: | |
| Beta-carotene | 0.09 |
| Titanium dioxide | 0.1 |
| EDTA | 0.008 |
| K-sorbate | 0.1 |
| Brine (26.5% salt) | 7.5 |
| Lactic acid | 0.06 |
| Lecithin | 0.1 |
| Liquid bean oil | 3.0 |
| Flavor | 0.02 |
| Total | 100.000 |

[1]Avicel® CL-611 supplied by FMC Corp.
[2]Frigex W supplied by National Starch and Chemical Corp.
[3]Keltrol, Kelco Div., Merck & Co.

The water, lactic acid and microcrystalline cellulose were dispersed in a tank with a triblender.

The remaining ingredients of Part 1 along with the beta-carotene, titanium dioxide, EDTA, potassium sorbate, brine and lactic acid were added to the tank through the triblender and recirculated for 15 minutes. The pH was adjusted to 4.8 and the mixture was heated to 185° F. for 1–2 seconds by passing the compositions through a scraped surface heat exchanger heated with steam.

The mixture was then cooled to 70° F. by passing the mixture through a scraped surface heat exchanger cooled with chilled water and ammonia. The oil, lecithin and flavor were added to the cooled mixture. The composition was passed through a colloid mill and then packaged and stored at 45° F.

We claim:

1. A squeezable spread composition which is a stable, essentially dispersed oil phase, in water comprising:

a) 1 to 5 wt. % of a combination of colloidal microcrystalline cellulose and carboxy methyl cellulose or salts thereof;

b) 0.5 to 3 wt. % of a cross-linked and stabilized starch;

c) 0.5 to 5 wt. % of a maltodextrin;

d) about 0.1 to about 2% of a hydrocolloid selected from the group consisting of xanthan gum, guar gum, carrageenan gum, locust bean gum, and mixtures thereof;

e) less than 5 wt. % of a fat;

f) about 0.01 to about 1 wt. % of an acidifier to maintain a pH of the composition;

g) 0 to 5 wt. % of an opacifier selected from the group consisting of titanium dioxide, milk solids and mixtures thereof;

h) about 0.05 to about 1% of a non-protein based emulsifier, or about 0.1 to about 3% of a protein based emulsifier, or mixtures thereof; and i) about 55 to about 95% by weight water.

2. A composition according to claim 1 wherein the pH of the composition is in a range of from 4.0–5.8.

3. A composition according to claim 1 wherein the fat is a vegetable oil or a butterfat.

4. A composition according to claim 1 wherein the crosslinked and stabilized starch is waxy cornstarch.

5. A composition according to claim 1 wherein the emulsifier is about 0.05 to about 1% of a non-protein based emulsifier.

6. A composition according to claim 1 wherein the emulsifier is about 0.1 to about 3% of a protein based emulsifier.

7. A composition according to claim 1 wherein the emulsifier is a mixture of about 0.05 to about 1% of a non-protein based emulsifier, and about 0.1 to about 3% of a protein based emulsifier.

8. A composition according to claim 1 comprising:

| Component | Wt. Percent |
|---|---|
| Water | 78–85 |
| Microcrystalline cellulose and sodium carboxy methyl cellulose | 2.5–3.5 |
| Maltodextrin | 1.5–3.0 |
| Modified waxy cornstarch | 1–2 |
| Guar gum | 0.1 |
| Xanthan gum | 0.3 |
| Beta-carotene | 0.09 |
| Titanium dioxide | 0.1 |
| EDTA | 0.008 |
| K-sorbate | 0.1 |
| Brine (26.5% salt) | 7.5 |
| Lactic acid | 0.06 |
| Lecithin | 0.1 |
| Liquid bean oil | 3.0 |
| Flavor | 0.02 |
| Total | 100.000. |

9. A composition according to claim 1, wherein said crossed-linked and stabilized starch is present in a ratio to microcrystalline cellulose of about 0.5:1 to about 2:1.

10. A composition according to claim 1, wherein said maltodextrin has a DE of 15 to 25.

* * * * *